(12) United States Patent
Wang et al.

(10) Patent No.: US 9,995,886 B2
(45) Date of Patent: Jun. 12, 2018

(54) CABLE CONNECTOR

(71) Applicant: FINISAR CORPORATION, Sunnyvale, CA (US)

(72) Inventors: William H. Wang, Pleasanton, CA (US); Yandong Mao, Shanghai (CN); Shamei Shi, Shanghai (CN); Zhongrui Shen, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 41 days.

(21) Appl. No.: 15/055,526

(22) Filed: Feb. 26, 2016

(65) Prior Publication Data

US 2017/0199340 A1    Jul. 13, 2017

(30) Foreign Application Priority Data

Jan. 8, 2016    (CN) .......................... 2016 1 0012600

(51) Int. Cl.
 *G02B 6/38* (2006.01)
 *G02B 6/42* (2006.01)

(52) U.S. Cl.
 CPC ......... *G02B 6/3887* (2013.01); *G02B 6/3821* (2013.01); *G02B 6/3869* (2013.01); *G02B 6/3879* (2013.01); *G02B 6/3893* (2013.01); *G02B 6/4246* (2013.01); *G02B 6/4292* (2013.01)

(58) Field of Classification Search
 CPC .... G02B 6/3825; G02B 6/3887; G02B 6/387; G02B 6/4292; G02B 6/3879; G02B 6/389; G02B 6/3821
 See application file for complete search history.

(56) References Cited

U.S. PATENT DOCUMENTS

| 9,235,013 | B1 * | 1/2016 | Chan | G02B 6/4292 |
| 2004/0052474 | A1 * | 3/2004 | Lampert | G02B 6/3869 |
| | | | | 385/78 |
| 2011/0116748 | A1 * | 5/2011 | Smrha | G02B 6/3825 |
| | | | | 385/76 |
| 2011/0222819 | A1 * | 9/2011 | Anderson | G02B 6/3825 |
| | | | | 385/78 |

(Continued)

FOREIGN PATENT DOCUMENTS

CN    104081236 A    10/2014

*Primary Examiner* — Thomas A Hollweg
*Assistant Examiner* — Mary A El Shammaa
(74) *Attorney, Agent, or Firm* — Maschoff Brennan

(57) ABSTRACT

An embodiment includes a cable connector that includes a connector housing, a fiber support structure, and a latch structure. The connector housing defines a housing cavity. The fiber support structure is attached to the connector housing and extends therefrom in a first direction. The fiber support structure defines a fiber cavity configured to receive a fiber subassembly. The latch structure is attached to the connector housing at a first end and extends therefrom in the first direction. The latch structure is separated in a second direction from the fiber support structure and includes a ramped surface at a second end. The ramped surface displaces the latch structure in a direction opposite the second direction in response to a force in a direction opposite the first direction and does not include a release structure configured to disengage the latch structure from latch tabs of a communication module.

20 Claims, 15 Drawing Sheets

(56) References Cited

U.S. PATENT DOCUMENTS

| | | | | |
|---|---|---|---|---|
| 2012/0099822 A1* | 4/2012 | Kuffel | ............... | G02B 6/383 385/78 |
| 2013/0108231 A1* | 5/2013 | Mertesdorf | .......... | G02B 6/3825 385/135 |
| 2013/0163934 A1* | 6/2013 | Lee | .................. | G02B 6/3879 385/78 |
| 2013/0183018 A1* | 7/2013 | Holmberg | ............ | G02B 6/3897 385/135 |
| 2014/0016902 A1* | 1/2014 | Pepe | ................. | G02B 6/3893 385/76 |
| 2014/0082913 A1* | 3/2014 | Marcouiller | ......... | G02B 6/3874 29/426.1 |
| 2017/0031109 A1* | 2/2017 | Meadowcroft | ...... | G02B 6/3893 |

* cited by examiner

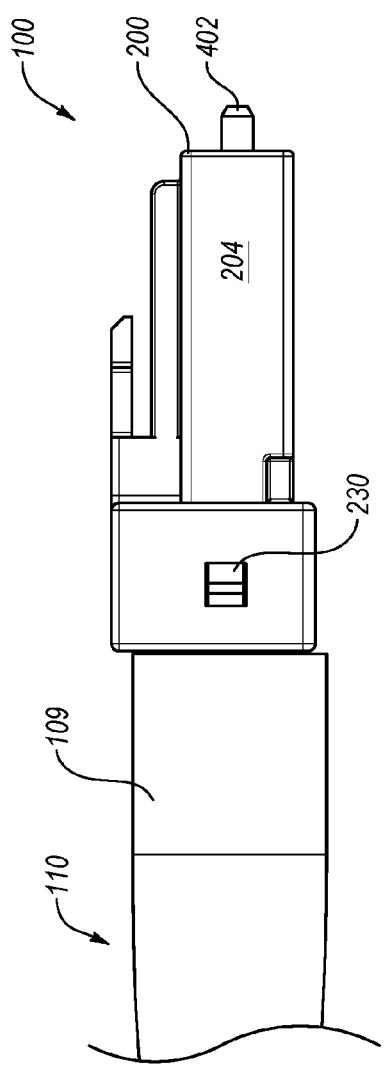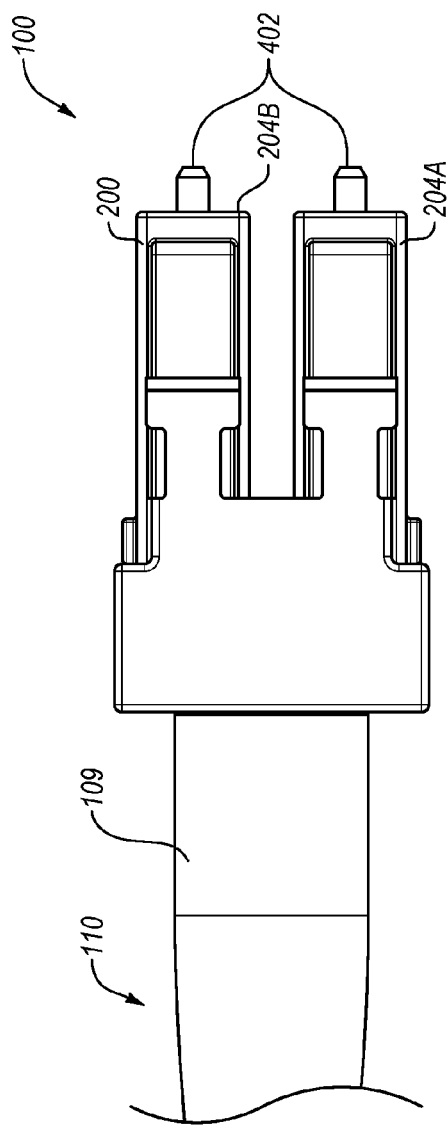

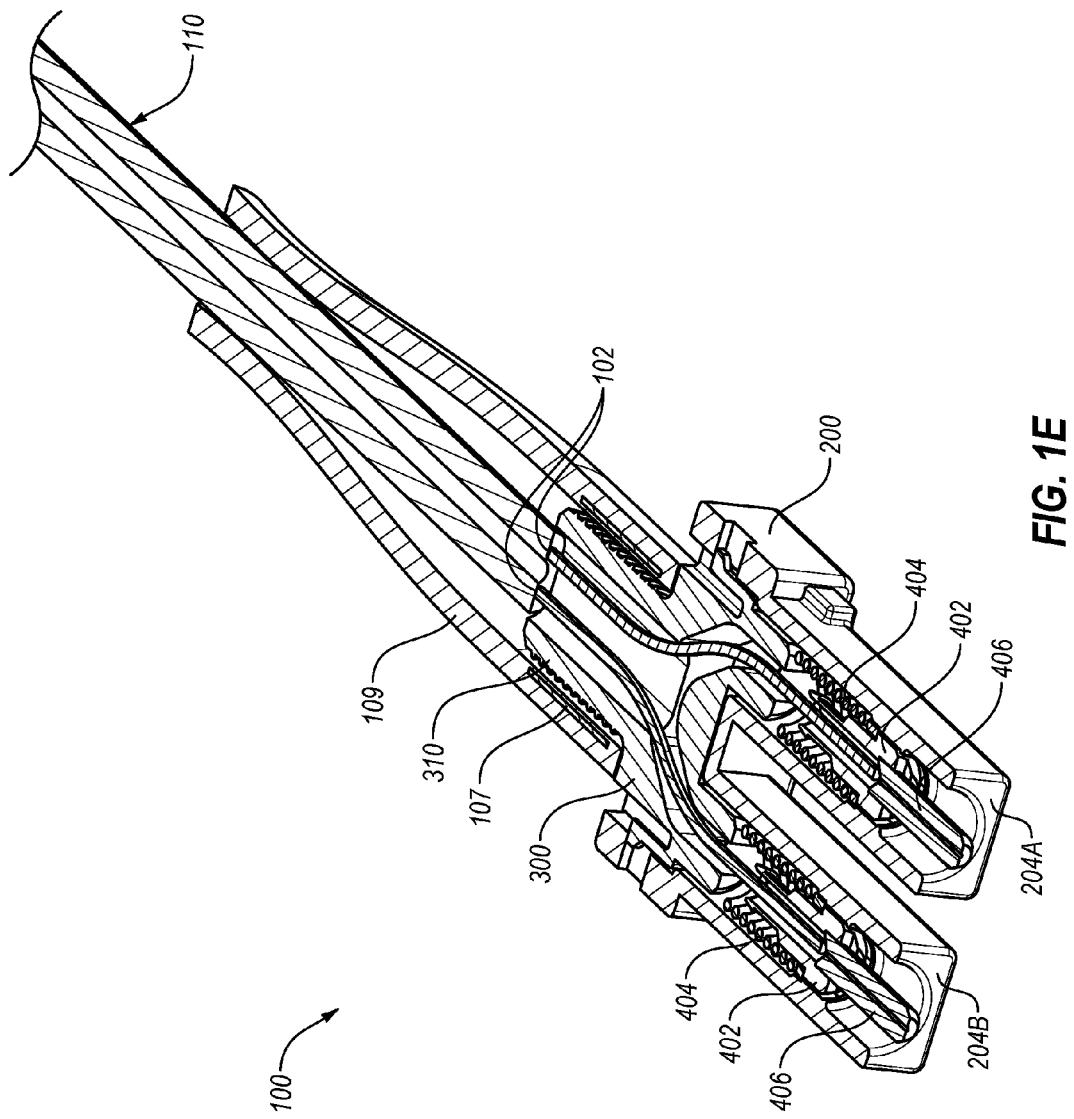

CABLE CONNECTOR

FIELD

The embodiments discussed herein are related to communication modules. In particular some embodiments relate to cable connectors for communication modules.

BACKGROUND

Communication modules may be used to communicate data in networks. In general, the communication modules may be implemented in the networks to convert optical signals to electrical signals and/or electrical signals to optical signals. The electrical signals may be communicated with host systems, which may house the communication modules. The optical signals may be communicated along optical cables to other communication modules or other host systems, for instance.

The optical cables may optically couple two or more communication modules. For example, the optical cables may connect a first communication module in a first server rack to one or more other communication modules in a second server rack. In applications in which the optical cables connect the communication modules, the communication modules may be configured to receive a cable connector that is positioned at a terminal portion of the optical cables. The cable connectors releasably connect to the communication module.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a cable connector assembly. The cable connector assembly includes a cable connector, two fiber subassemblies, and a cable block. The cable connector is configured to retain portions of optical fibers and to be engaged with a communication module that is configured to receive LC connectors. The cable connector includes a connector housing, two fiber support structures, and a latch structure. The connector housing defines a housing cavity. The two fiber support structures are dimensioned to substantially comply with an LC connector standard, to connect to the connector housing, and to extend in a first direction from the connector housing. The latch structure connects to the connector housing, extends in the first direction from the connector housing, is separated from the two fiber support structures in a second direction, and does not include a release structure configured to disengage the latch structure from latch tabs of the communication module. The two fiber subassemblies are at least partially positioned in fiber cavities defined by the fiber support structures. The cable block is positioned at least partially within the housing cavity. The cable block is configured to receive two optical fibers and route one of the optical fibers into each of the fiber support structures.

Another example embodiment includes a cable connector. The cable connector includes a connector housing, a fiber support structure, and a latch structure. The connector housing defines a housing cavity. The fiber support structure is attached to the connector housing and extends from the connector housing in a first direction. The fiber support structure defines a fiber cavity that is configured to receive a fiber subassembly. The latch structure is attached to the connector housing at a first end and extends from the connector housing in the first direction. The latch structure is separated in a second direction from the fiber support structure and includes a ramped surface at a second end. The ramped surface is configured to displace the latch structure in a direction opposite the second direction in response to a force in a direction opposite the first direction and does not include a release structure configured to disengage the latch structure from latch tabs of a communication module.

Another example embodiment includes an active optical cable. The active optical cable includes an optical cable, a cable connector assembly, and a communication module. The optical cable includes one or more optical fibers. The cable connector assembly is positioned at an end of the optical cable. The cable connector assembly includes a cable connector with a latch structure that is configured to retain portions of the optical fibers and one or more optical fiber subassemblies. The communication module is configured to electrically interface with a host system at a first end and includes optical subassemblies and one or more latch tabs at a second end. The communication module is configured to optically interface with an LC type optical fiber connector. The active optical cable is configurable in a permanently-assembled arrangement in which the latch structure is engaged with the latch tabs to join to the communication module relative to the cable connector assembly such that the cable connector assembly is substantially fixed relative to the communication module and the optical fibers are coupled to the optical subassemblies.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 1A-1F illustrate an example cable connector assembly;

DESCRIPTION OF SOME EXAMPLE EMBODIMENTS

Data communication in optical networks may involve communication modules. The communication modules may be configured to convert optical signals to electrical signals and/or electrical signals to optical signals. Optical cables may optically couple two or more of the communication modules together.

In these and other applications, the communication modules may be configured to receive a cable connector that is positioned at a terminal portion of the optical cables. Generally, a connection between the cable connector and the communication module may be easily releasable. For example, the cable connector may include a release lever that disengages the cable connector from the communication module.

In some implementations, it may be advantageous to permanently connect or substantially permanently connect the optical cable to the communication module. For example, it may be advantageous in implementations in which the optical cables will likely not be released from the communication module and/or it is important to ensure connection between the optical cables and the communication module. Accordingly, some embodiments described herein include a cable connector that enables a permanent or substantially permanent connection between the cable connector and the communication module.

In addition, active optical cables may be used in optical networks. The active optical cables may include conversion components (e.g., photodiodes, optical sources, etc.) of the communication module coupled to optical fibers. In construction of the active optical cables, a housing of an end of the active optical cable may include the conversion components along with terminal portions of the optical fiber. The construction of the active optical cables may be complex, at least partially because of the integration of the optical fibers with the conversion components. Accordingly, some embodiments described in the disclosure may be used to build active optical cables from one or more communication modules and one or more optical cables. For example, the cable connector may enable the permanent or substantially permanent connection between the communication modules and the optical cable.

Some additional details of these and other embodiments are described with reference to the appended figures. In the appended figures, structures and features with the same item numbers are substantially the same unless indicated otherwise.

Figure 1A:
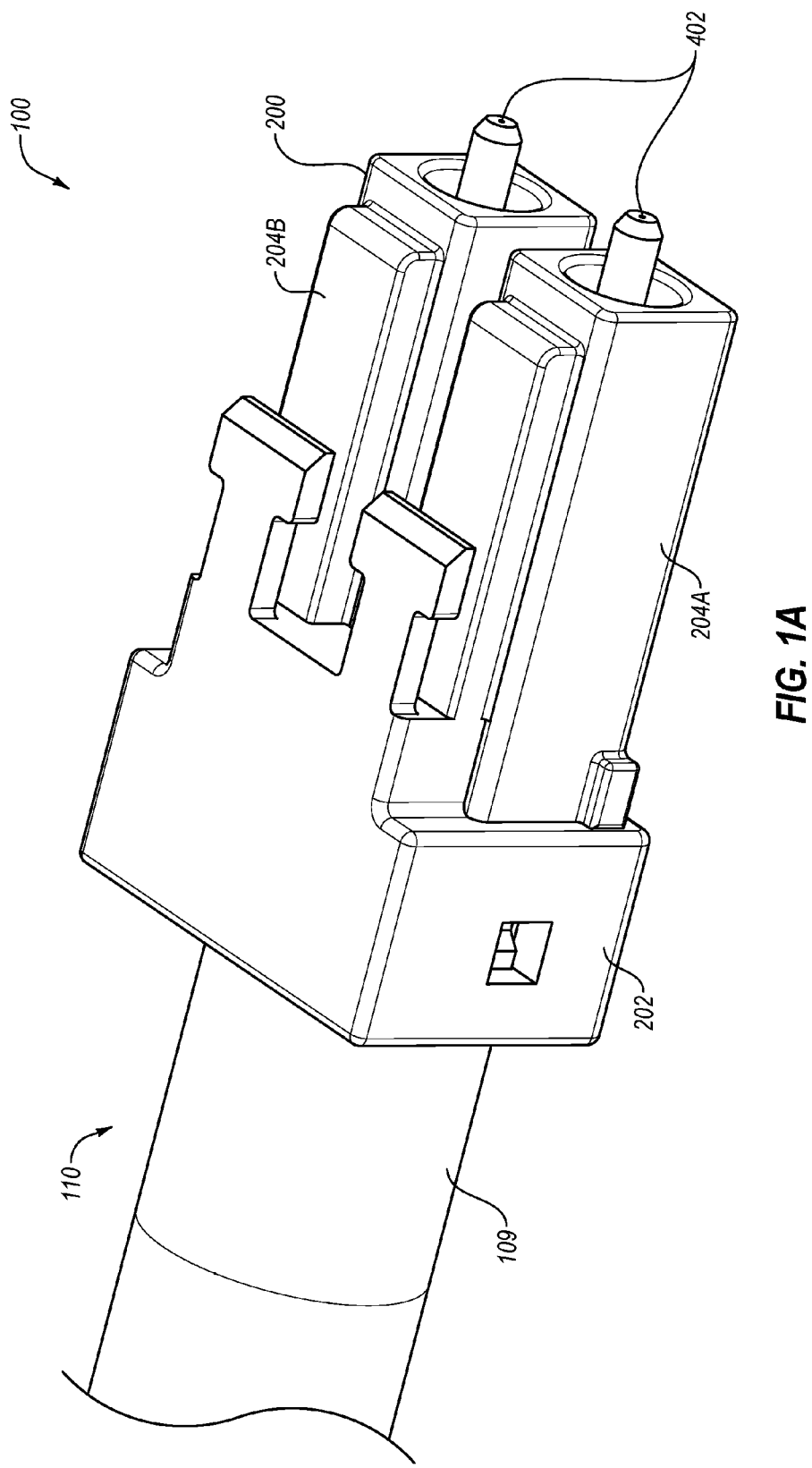
Figure 1B:
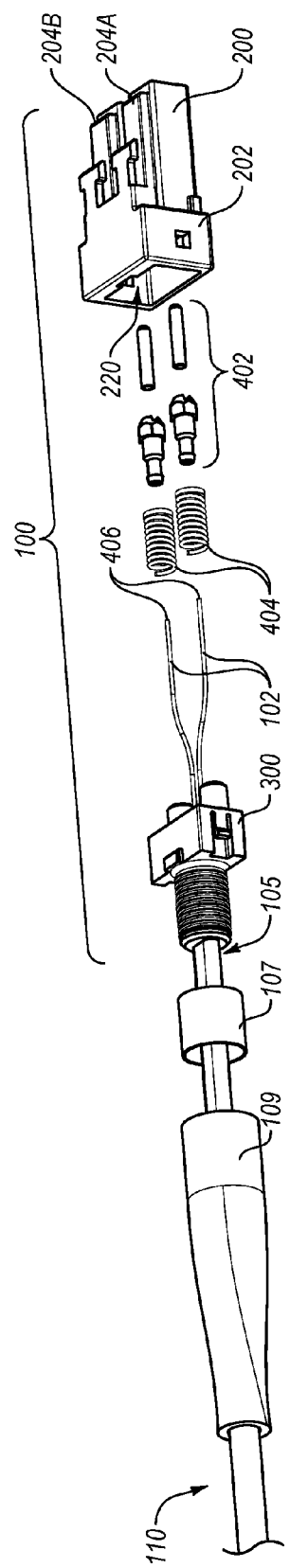
Figure 1F:
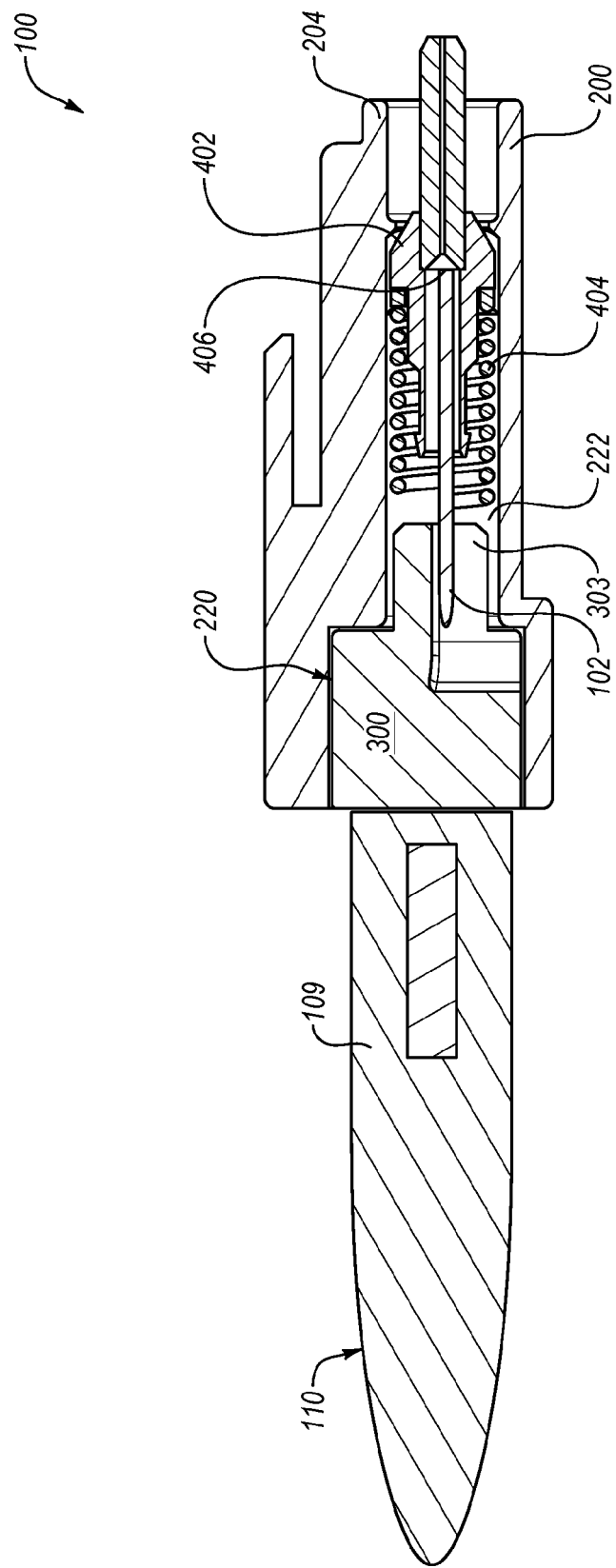

FIGS. 1A-1F illustrate an example cable connector assembly 100. In particular, FIG. 1A depicts a perspective view of the cable connector assembly 100. FIG. 1B depicts an exploded view of the cable connector assembly 100. FIG. 1C depicts a side view of the cable connector assembly 100. FIG. 1D depicts a top view of the cable connector assembly 100. FIG. 1E depicts a first sectional view of the cable connector assembly 100. FIG. 1F depicts a second sectional view of the cable connector assembly 100.

The cable connector assembly 100 may be configured to latch an optical cable 110 to a communication module (e.g., 502 described below). For example, the cable connector assembly 100 may be configured to attach or permanently attach and latch the optical cable 110 to the communication module. In some embodiments, the cable connector assembly 100 may be configured to receive connectors that substantially conform to a Lucent connector (LC) standard or another standard (e.g., an SC standard or an FC standard).

The cable connector assembly 100 may provide a permanently-assembled arrangement between the optical cable 110 and the communication module. In the permanently-assembled arrangement, the cable connector assembly 100 or a cable connector 200 included therein may not be released from the communication module without specific tools. For instance, the cable connector 200 may omit a release structure that enables a user to disengage the cable connector assembly 100 from the communication module. In some embodiments, and in an absence of the specific tools, the cable connector assembly 100 may not be released from the communication module without permanently deforming or destroying at least some portion of the cable connector assembly 100 or the communication module. Accordingly, the cable connector assembly 100 may be used to construct active optical cables that include one or more communication modules, one or more cable connector assemblies 100, and one or more optical cables 110.

The embodiment depicted in FIGS. 1A-1F may include the cable connector 200. The cable connector 200 may be configured to retain portions of optical fibers 102. One or both of the optical fibers 102 may be single mode fibers (SMF) or multi-mode fibers (MMF). In the depicted embodiment, there are two optical fibers 102. In other embodiments there may be one or more optical fibers 102.

The optical fibers 102 may be positioned within the optical cable 110. In some embodiments, the optical fibers 102 may be included within a jacket that may contain the optical fibers 102. In addition, the optical cable 110 may be connected to a cable block 300. For example, in the embodiment of FIGS. 1A-1F, a crimp ring 107 attaches to a tubular portion 310 of the cable block 300, which connects the cable block 300 to the optical cable 110. A cable boot 109 may be positioned over the crimp ring 107 and a terminal portion of the jacket.

The optical fibers 102 may be retained in the cable connector 200 relative to one or more ferrules 402, the cable block 300, one or more coiled springs 404, or some combination thereof. For example, ends 406 of the optical fibers 102 may be held relative to the ferrules 402, e.g., in optical alignment with the ferrules 402. Portions of the ferrules 402 may protrude from the cable connector 200 to interface with optical subassemblies (OSAs) of a communication module. For example, as shown in FIGS. 1A, and 1C-1F, portions of the ferrules 402 protrude from the cable connector 200. When positioned in the communication module, the ferrules 402 may optically align with the OSAs of the communication module, which may enable optical communication between the OSAs and the optical fibers 102.

With reference to FIGS. 1B, 1E and 1F, portions of the optical fibers 102 may exit the optical cable 110 and enter the cable block 300. The cable connector 200 may define a housing cavity 220, which may be configured to receive the cable block 300. Portions of the optical fibers 102 may proceed through the cable block 300. The portions of the optical fibers 102 may then interface with the ferrules 402. The ferrules 402 may be positioned in fiber support structures 204A and 204B (generally, fiber support structure 204 or fiber support structures 204) along with the coiled springs 404.

Figure 2A:
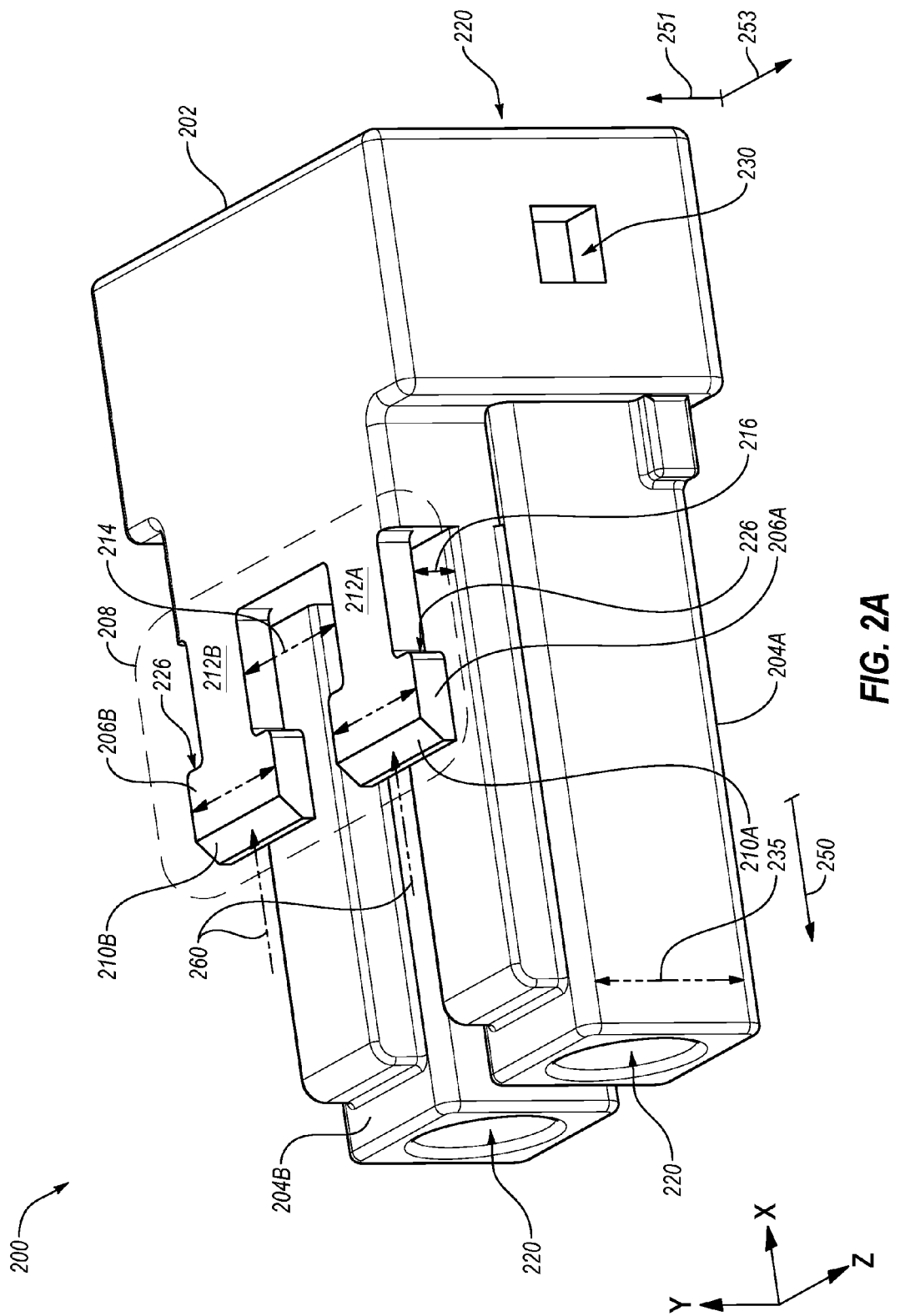
FIGS. 2A and 2B illustrate an example of a cable connector that may be implemented in the cable connector assembly of FIGS. 1A-1F.
Figure 2B:
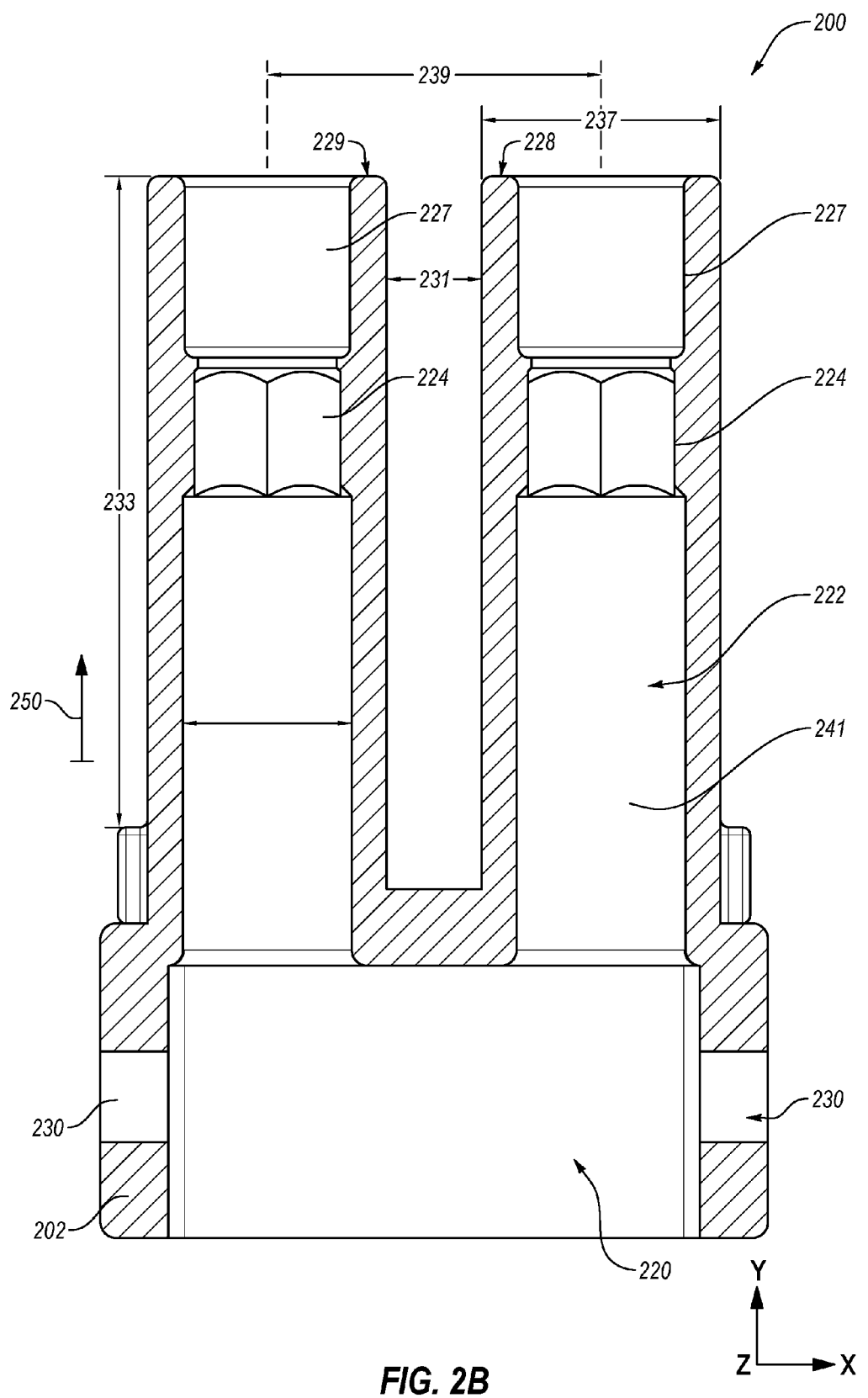

FIGS. 2A and 2B illustrate an example of the cable connector 200. The cable connector 200 may include a connector housing 202, the fiber support structures 204, and a latch structure 208. The connector housing 202 may include a portion of the cable connector 200 that is adjacent to the optical cable 110. For example with reference to FIG. 1A, the connector housing 202 is depicted adjacent to the cable boot 109, which may include a terminal portion of the optical cable 110.

Referring back to FIGS. 2A and 2B, the connector housing 202 may define the housing cavity 220. As discussed above, some portions of the cable block 300 and the optical fibers 102 may be positioned within the housing cavity 220. In addition, in the depicted embodiment, the connector housing 202 may define one or more stub openings 230. The stub openings 230 may be configured to receive positioning stubs 302 of FIGS. 3A-3C. In some embodiments including the stub openings 230, when the cable block 300 is positioned in the connector housing 202, the positioning stubs 302 may be received in the stub openings 230, which may retain the cable block 300 relative to the cable connector 200.

The fiber support structures 204 may connect to the connector housing 202. The fiber support structures 204 may extend from the connector housing 202 in a first direction, which is generally represented in FIGS. 2A and 2B by arrow 250. The fiber support structures 204 may each include a generally rectangular box structure that defines fiber cavities 222. The fiber cavities 222 are configured to receive fiber subassemblies 400 of FIG. 4. For example, the fiber cavities 222 may include a hexagonal portion 224 that is complementary to and may correspond to a portion of a ferrule such as the ferrules 402 of FIG. 1B. In addition, the fiber cavities 222 may be configured to receive portions of OSAs. For example, at an end 229 opposite the connector housing 202, the fiber cavities 222 may include OSA portions 227. The OSA portions 227 may be configured to receive a portion of an OSA included in a communication module such as a barrel of the OSA. When the barrel of the OSA is positioned in one of the OSA portions 227, an active component included in the OSA may be aligned with an optical fiber (e.g., optical fiber 102) positioned in the cable connector 200 via a corresponding one of the ferrules 402.

A remaining portion 241 of each of the fiber cavities 222 may be substantially cylindrical. The remaining portions 241 may be configured to receive a coiled spring such as the coiled spring 404 described elsewhere in this disclosure and/or cylindrical portions of a cable block. For example, with reference to FIGS. 1F, 2B and 3A-3C, cylindrical portions 303 of the cable block 300 may extend from a rectangular portion 301 of the cable block 300. When the cable block 300 is positioned in the housing cavity 220, the cylindrical portions 303 may be positioned in the remaining portions 241 of the fiber cavities 222. In FIG. 1F, the cylindrical portions 303 are depicted positioned in the fiber cavity 222. Some additional details of the fiber subassemblies 400 are provided with reference to FIG. 4.

Referring back to FIGS. 2A and 2B, in this and other embodiments, the fiber support structures 204 may be dimensioned to substantially comply with an LC connector standard such as a standard LC duplex connector standard or a mini LC duplex connector standard. For example, a first dimension 231 between the fiber support structures 204, a second dimension 233 that includes a length of a portion of the fiber support structures 204 that is positioned in the communication module, a height 235 of the fiber support structures 204, a distance 239 between centerlines of the fiber support structures 204, a width 237 of the fiber support structures 204, or some combination thereof may comply with the LC connector standard.

The latch structure 208 may connect to the connector housing 202 and may extend in the first direction 250 from the connector housing 202. The latch structure 208 may be separated from the fiber support structures 204 in a second direction, which is represented in FIG. 2A by arrow 251. The latch structure 208 may be configured to latch the cable connector 200 relative to a communication module.

In some embodiments, the latch structure 208, the cable connector 200, the cable connector assembly 100, and/or the communication module may not include a release structure configured to disengage the latch structure 208 from latch tabs of the communication module. Accordingly, in embodiments in which the latch structure does not include the release structure, a user may not be able to disengage the cable connector 200 from the communication module without a specific tool or without damaging the cable connector 200 or the communication module.

In the depicted embodiment, the latch structure 208 includes retaining tabs 206A and 206B (generally, retaining tab 206 or retaining tabs 206). The retaining tabs 206 may be connected to the connector housing 202 by longitudinal sections 212A and 212B (generally, longitudinal section 212 or longitudinal sections 212). In general, the retaining tabs 206 may have a larger dimension in a third direction 253, which is substantially perpendicular to the first direction 250 and the second direction 251.

An intra-longitudinal section distance 214 may be defined between the longitudinal sections 212. The intra-longitudinal section distance 214 may be in the third direction 253. The intra-longitudinal section distance 214 may substantially correspond to a width of a retaining structure of the communication module. For example, the intra-longitudinal section distance 214 may correspond with an LC connector retaining structure of the communication module.

The retaining tabs 206 may include a ramped surface 210A or 210B (generally, ramped surface 210 or ramped surfaces 210). The ramped surfaces 210 may be positioned on ends of the retaining tabs 206. The ends of the retaining tabs 206 on which the ramped surfaces 210 reside may be opposite ends that are connected to the connector housing 202. The ramped surfaces 210 may be angled or sloped relative to the second direction 251 (FIG. 2A only). For example, in the embodiment of FIG. 2A, the ramped surfaces 210 may be angled relative to the YZ plane and/or the XZ plane.

The ramped surface 210 is configured to displace the retaining tab 206 in a direction opposite the second direction 251 in response to a force 260 in a direction opposite the first direction 250. In FIG. 2A, the direction opposite the second direction 251 is in the negative y-direction of an arbitrarily defined coordinate system. Additionally, the direction opposite the first direction 250 is in the negative x-direction of the arbitrarily defined coordinate system. Some additional details of the cam surface 210 being displaced are provided with reference to FIGS. 6A-6H.

The retaining tabs 206 may include contact surfaces 226. The contact surfaces 226 may be substantially parallel to the second direction 251 and may represent a trailing surface of the retaining tabs 206. For instance, as discussed below, the contact surfaces 226 are opposite the ramped surfaces 210 on the retaining tabs 206. The ramped surfaces 210 may be the leading surfaces as the cable connector 200 is engaged with the communication module. To engage the cable connector 200 with the communication module, the cable connector 200 may be moved relative to the communication module until the contact surfaces 226 pass a datum defined on a trailing surface of a latch tab of a connector retaining structure (e.g., 510 discussed elsewhere in this disclosure). The contact surfaces 226 may be configured to retain the retaining tabs 206 relative to the communication module as described elsewhere in this disclosure.

Figure 3A:
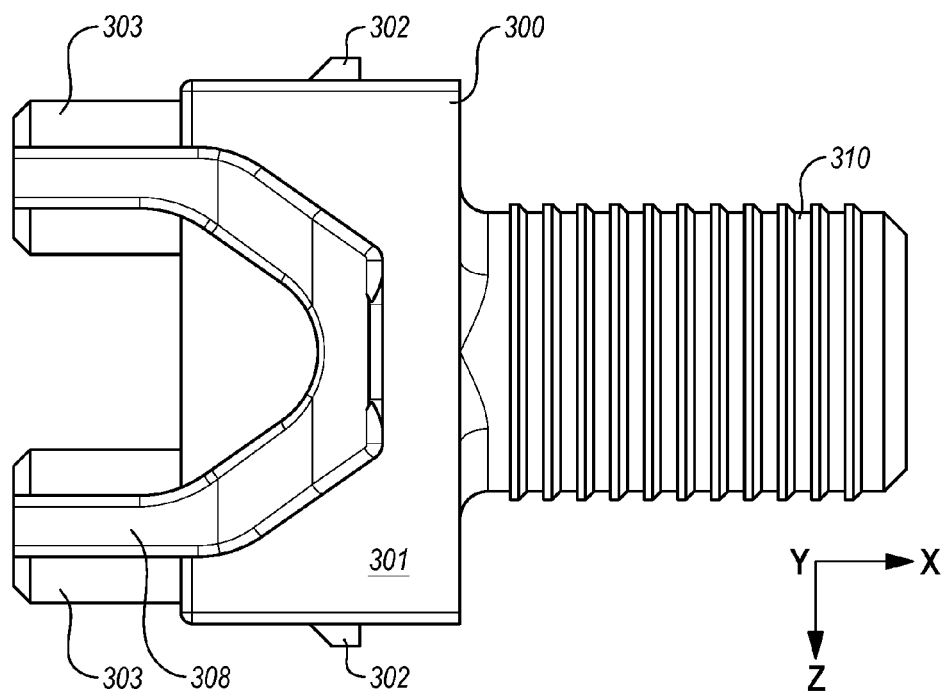
FIGS. 3A-3C illustrate an example embodiment of a cable block that may be implemented in the cable connector assembly of FIGS. 1A-1F.
Figure 3B:
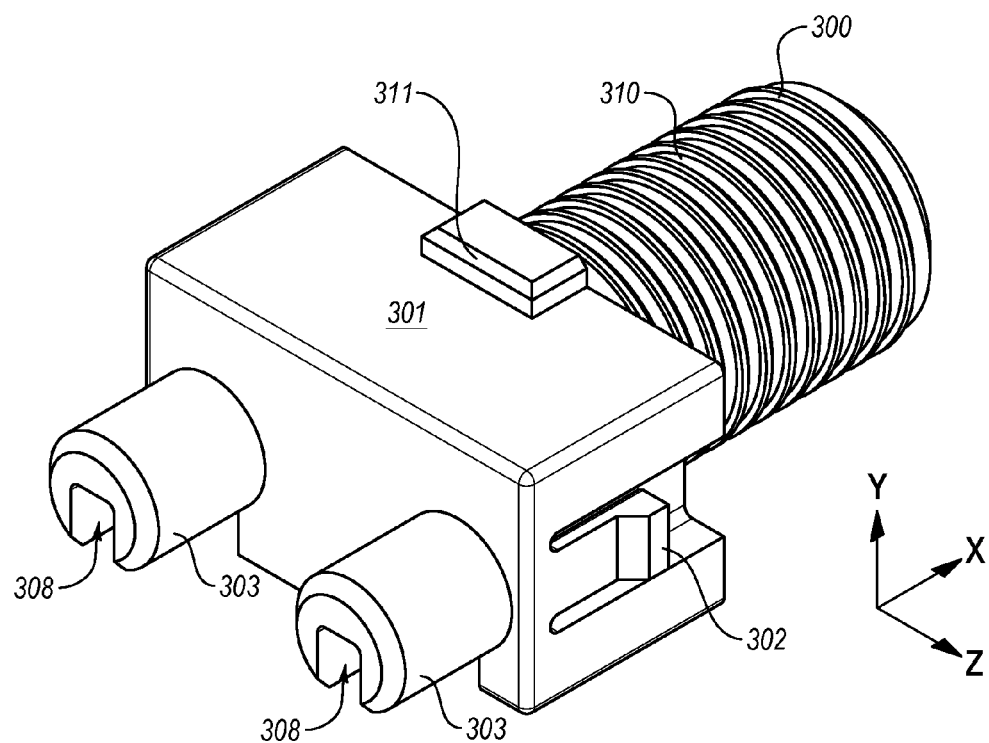
Figure 3C:
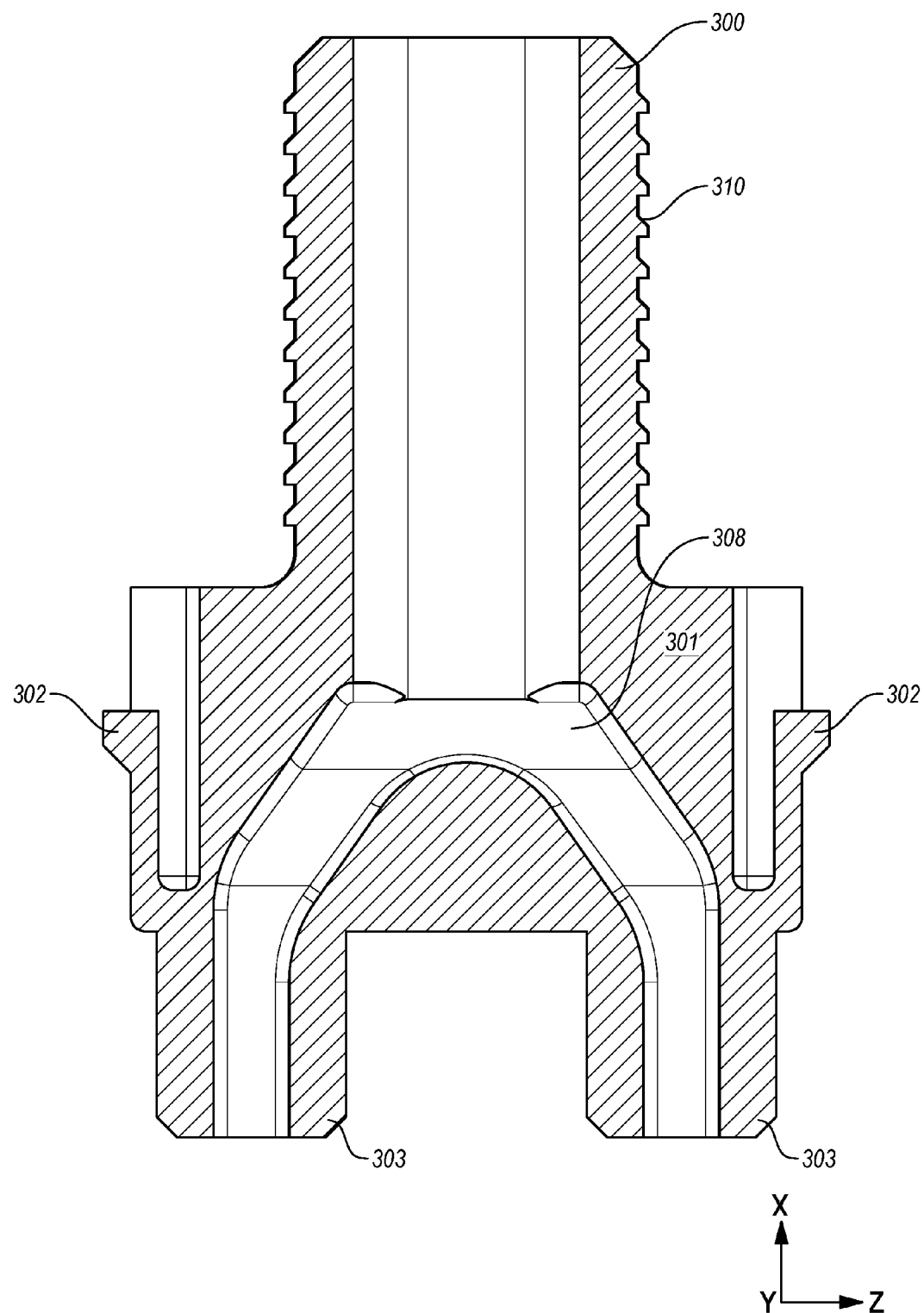

FIGS. 3A-3C illustrate an example embodiment of the cable block 300. FIG. 3A depicts a bottom view of the cable block 300. FIG. 3B depicts a perspective view of the cable block 300. FIG. 3C depicts a sectional view of the cable block 300. The cable block 300 may be configured to retain optical fibers such as the optical fibers 102 described elsewhere in this disclosure.

The cable block 300 may include the cylindrical portions 303 and a tubular portion 310 connected to the rectangular portion 301. The cylindrical portions 303 may be connected to a first end of the rectangular portion 301 and the tubular portion 310 may be connected to a second end of the rectangular portion 301.

With reference to FIGS. 1E and 3A-3C, the tubular portion 310 may be configured to receive the crimp ring 107 and may be covered by the cable boot 109. Portions of the optical fibers 102 may be positioned in the tubular portion 310. The cable block 300 may include a Y-channel 308. A portion of the Y-channel 308 may be in the tubular portion 310, another portion of the Y-channel 308 may be in the rectangular portion 301, and another portion of the Y-channel 308 may be in the cylindrical portions 303. A portion of the optical fibers 102 may extend through the Y-channel 308, which may route the optical fibers 102 from the optical cable 110 to the fiber support structures 204. The optical fibers 102 may be separated by the Y-channel 308 and supported by the Y-channel 308.

Referring to FIGS. 2A and 3C, as discussed above, the connector housing 202 defines the stub openings 230 that are configured to receive the positioning stubs 302 of the cable block 300. The positioning stubs 302 may be separated from the rectangular portion 301. For instance, in the embodiment of FIGS. 3A and 3B, the positioning stubs 302 may be separated in the x-direction from the rectangular portion 301. When introduced into the housing cavity 220, the positioning stubs 302 may be temporarily deflected by sidewalls of the housing cavity 220 inwards towards the rectangular portion 301. When positioned in the stub openings 230, the positioning stubs 302 may re-position in the stub openings 230 to or at least towards the un-deflected orientation illustrated in FIG. 3B. Flat trailing surfaces of the positioning stubs 302 that may generally be parallel to the YZ plane may engage corresponding flat trailing surfaces of the stub openings 230 that may also be generally parallel to the YZ plane to retain the cable block 300 relative to the cable connector 200 in the event a force or forces is or are exerted on the cable block 300 and/or the cable connector 200 relative to the other in opposite directions along the x axis.

With reference to FIGS. 2A and 3B, the cable block 300 may include one or more positioning blocks 311. The positioning blocks 311 may be attached to the rectangular portion 301. When the cable block 300 is positioned within the housing cavity 220, the positioning block 311 may position the cable block 300 relative to the cable connector 200.

Figure 4:
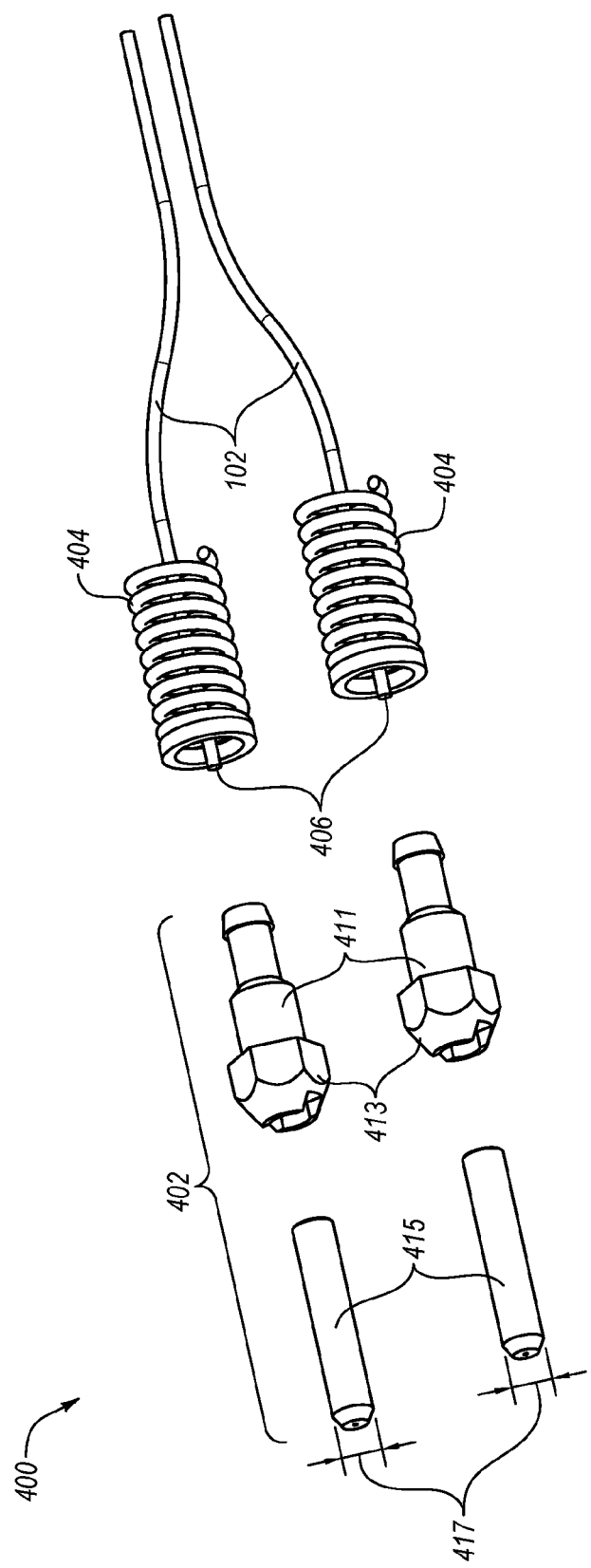
FIG. 4 illustrates example fiber subassemblies that may be implemented in the cable connector assembly of FIGS. 1A-1F.

FIG. 4 illustrates example fiber subassemblies 400 that may be implemented in the cable connector assembly 100. In general, the fiber subassemblies 400 may be positioned in the fiber support structures 204 described elsewhere in this disclosure. In addition, the fiber subassemblies 400 may position the optical fiber 102 relative to OSAs in the communication module. Moreover, the fiber subassemblies 400 may support ends 406 of the optical fibers 102.

The fiber subassemblies 400 may include the ferrules 402. The ferrules 402 are configured to be coupled to the ends 406 of the optical fibers 102. The ferrules 402 include a hexagonal ferrule portion 413 connected to a front ferrule portion 415 and a rear ferrule portion 411. The hexagonal ferrule portion 413 may be configured to be positioned in the hexagonal portion 224 of the fiber cavities 222 described elsewhere in this disclosure. The front ferrule portion 415 may be configured to interface with an OSA of a communication module. For example, the front ferrule portion 415 may each include a width 417 that may be received by the OSA. The coiled springs 404 may be configured to surround the rear ferrule portions 411 of the ferrules 402. The coiled spring 404 may surround the rear ferrule portion 411 of the ferrule 402.

Figure 5:
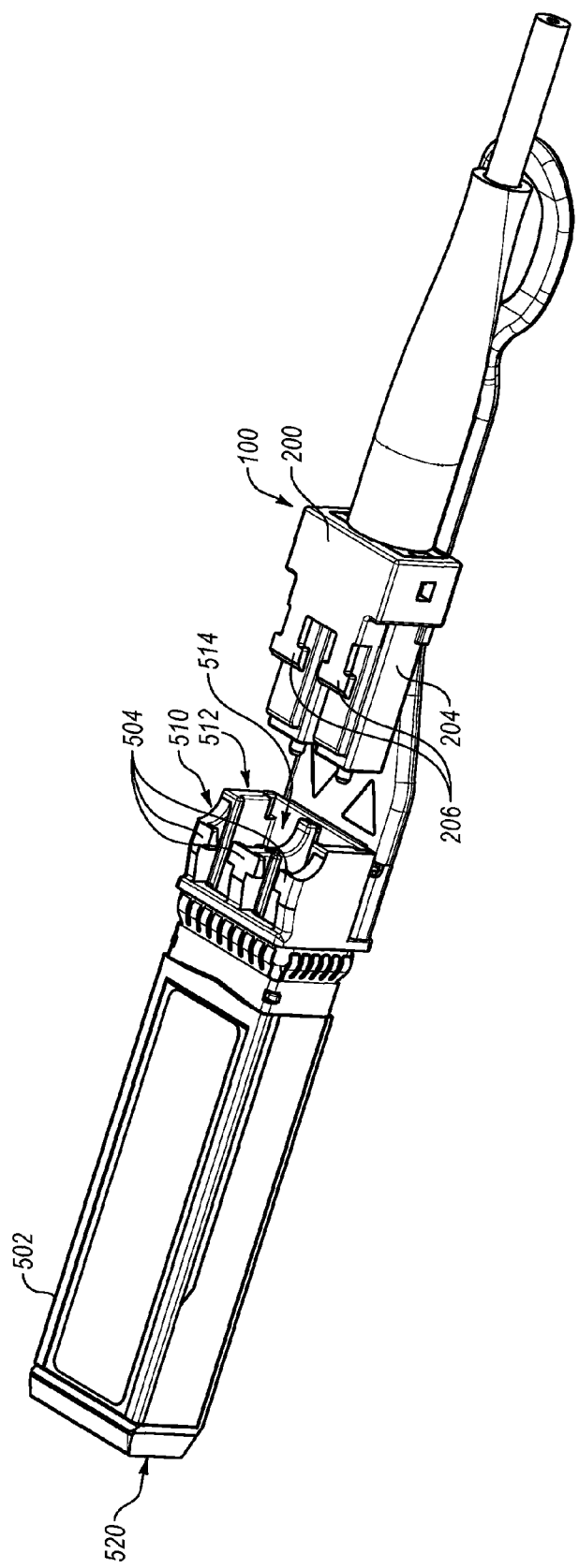
FIG. 5 illustrates the cable connector assembly of FIGS. 1A-1F and an example communication module.

FIG. 5 illustrates the cable connector assembly 100 of FIGS. 1A-1F and an example communication module 502. The cable connector assembly 100 is depicted disengaged from and aligned with the communication module 502. The communication module 502 may be configured to electrically interface with a host system (not shown) at a first end 520. At a second end 512, the communication module 502 may be configured to optically interface with one or more optical fibers such as the optical fibers 102 described in this disclosure. The communication module 502 may convert electrical signals received at the first end 520 to optical signals representative of the electrical signals. The optical signals may be communicated via the optical fibers to an optical network (not shown). Additionally or alternatively, the communication module 502 may receive optical signals from an optical network via the optical fibers and convert the optical signals to electrical signals. The electrical signals may be communicated from the communication module 502 to the host signal. In embodiments in which the communication module 502 performs optical-to-electrical conversions or electrical-to-optical conversions, the communication module 502 may include OSAs, which cannot be seen on FIG. 5.

At the second end 512, the communication module 502 may include a connector retaining structure 510. The connector retaining structure 510 may include one or more latch tabs 504. The latch tabs 504 may be configured to interface with the retaining tabs 206 and to apply forces (e.g., 260 of FIG. 2A) to ramped surfaces 210 of the retaining tabs 206. In the depicted embodiment, the latch tabs 504 may substantially comply with the LC connector standard. In some embodiments, the latch tabs 504 may comply with one or more other connector standards.

In addition, the connector retaining structure 510 may define connector cavities 514. The connector cavities 514 may be configured to receive the fiber support structures 204. After the fiber support structures 204 are received in the connector cavities 514 at least to the point that the contract surfaces 226, which represent the trailing surfaces of the retaining tabs 206, clear trailing surfaces of the latch tabs 504 in the negative x direction, the cable connector 200 may be secured to the communication module 502. In particular, in some embodiments, the communication module 502 and the cable connector 200 may be joined in a permanently-assembled arrangement.

Additionally or alternatively, the communication module 502 and the cable connector assembly 100 may be included in an active optical cable. The active optical cable may include a first example of the communication module 502 in a permanently-assembled arrangement with a first example of the cable connector assembly 100, a second example of the communication module 502 in a permanently-assembled arrangement with a second example of the cable connector assembly 100, and the optical cable 110 connecting the first example of the cable connector assembly 100 to the second example of the cable connector assembly 100.

FIGS. 6A-6H depict an example sequence 600 of joining the cable connector assembly 100 described in this disclosure with the connector retaining structure 510 of the communication module 502 of FIG. 5. FIGS. 6A-6D depict planar sectional views and FIGS. 6E-6H depict perspective section views. In general, 6A and 6E are two views of one position, 6B and 6F are two views of one position, 6C and 6G are two views of one position, and 6D and 6H are two views of one position. When joining the cable connector assembly 100 to the communication module 502, the position depicted in FIGS. 6A and 6E occurs prior to the position depicted in FIGS. 6B and 6F. The position depicted in FIGS. 6B and 6F occurs prior to the position depicted in FIGS. 6C and 6G. The position depicted in FIGS. 6C and 6G occurs prior to 6D and 6H. In FIGS. 6A-6H, the cable connector assembly 100 is depicted in a constructed configuration. For example, the fiber subassemblies 400 (of FIG. 4) are positioned within the cable connector 200.

Figure 6A:
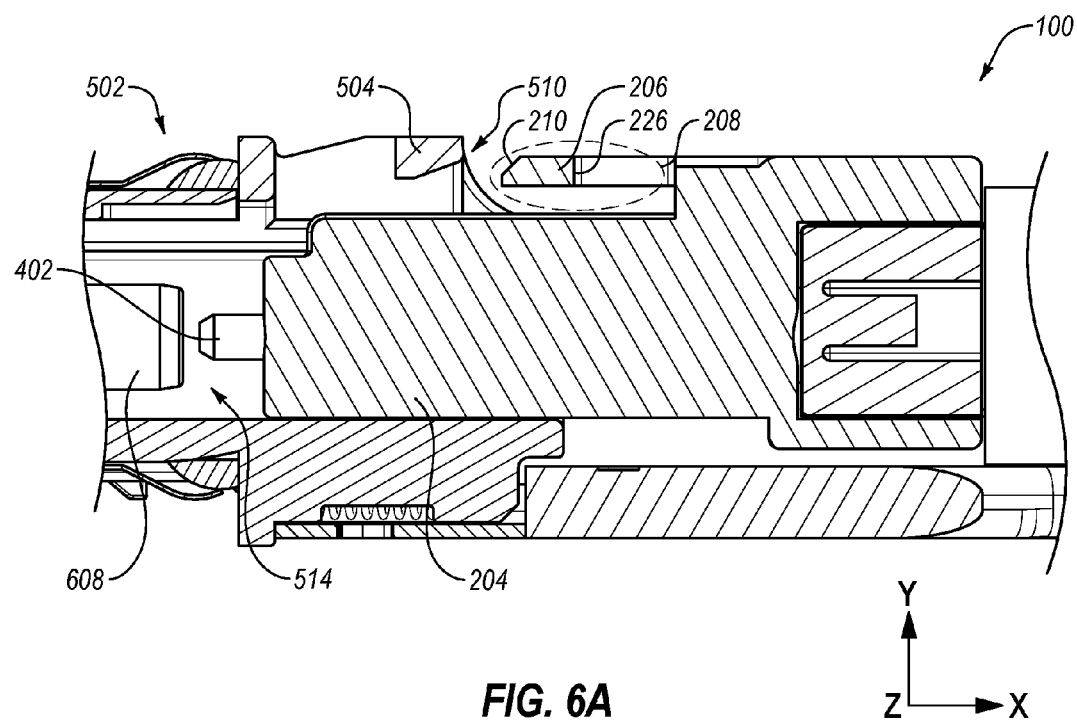
FIGS. 6A-6H depict an example sequence of joining the cable connector assembly of FIGS. 1A-1F with the communication module of FIG. 5, all in accordance with at least one embodiment described herein.
Figure 6E:
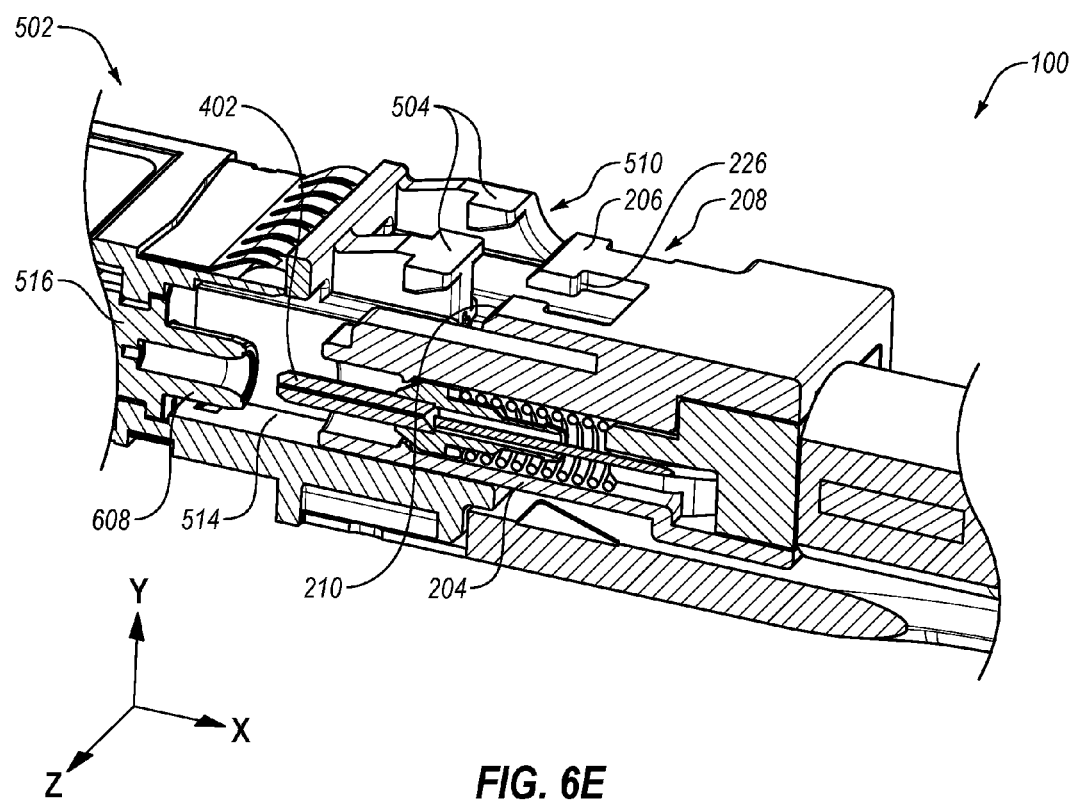

In FIGS. 6A and 6E, the cable connector assembly 100 is depicted disengaged from the communication module 502. When the cable connector assembly 100 is disengaged from the communication module 502, the latch structure 208 is separated in the x-direction from the latch tab 504. Additionally, the fiber support structures 204 are positioned partially within connector cavities 514 and the ferrule 402 is separated from an OSA 608.

Figure 6B:
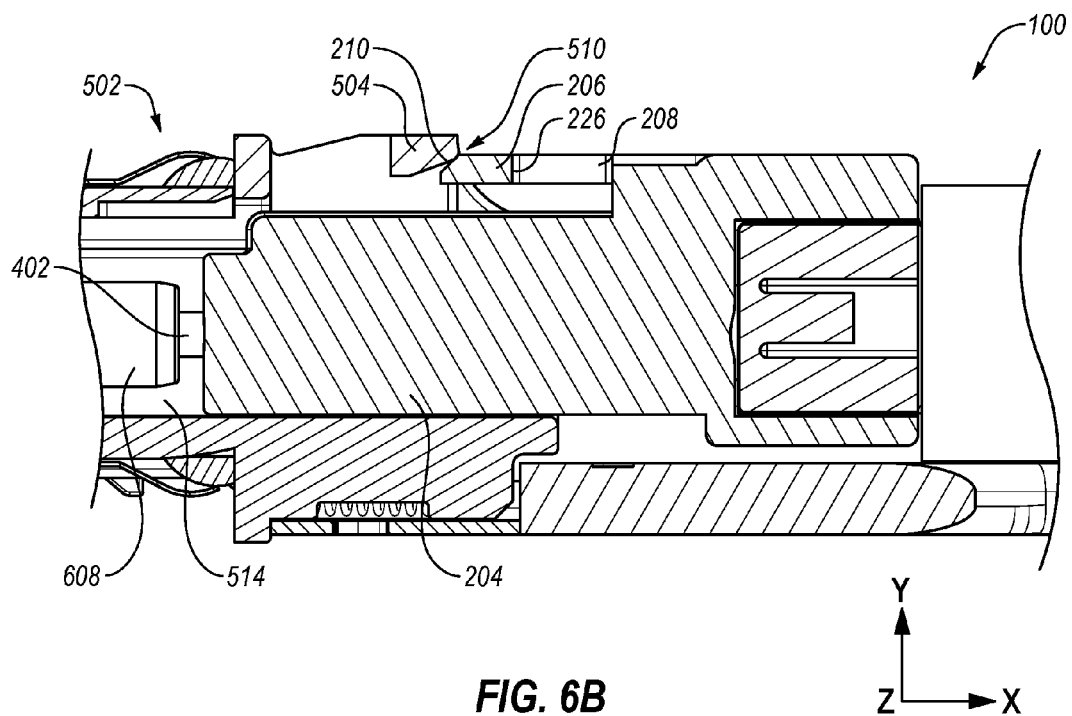
Figure 6F:
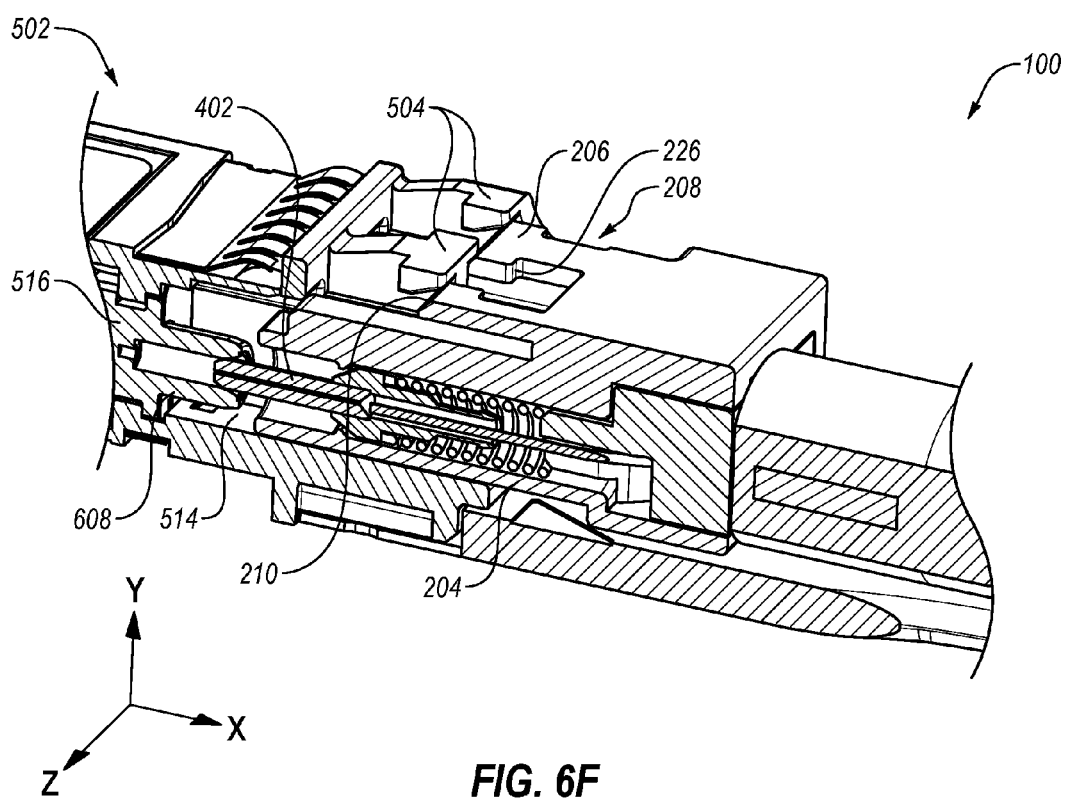

In FIGS. 6B and 6F, the cable connector assembly 100 is depicted partially disengaged from the communication module 502. To transition from the position of FIGS. 6A and 6E to the position depicted in FIGS. 6B and 6F, the cable connector assembly 100 may be moved in the negative x-direction relative to the communication module 502. When the cable connector assembly 100 is partially disengaged from the communication module 502, the retaining tab 206 of the latch structure 208 is in contact with the latch tab 504. Additionally, the ferrule 402 may be in contact with the OSA 608 or partially inserted therein. In particular, the ferrule 402 may be partially positioned within a port assembly of the OSA 608.

Figure 6C:
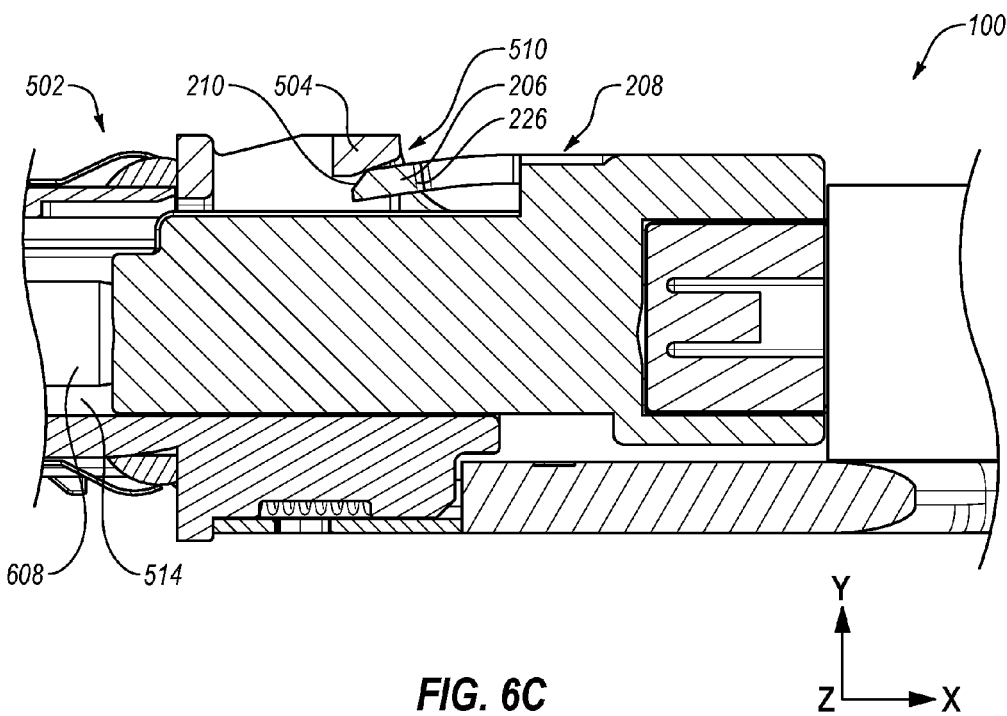
Figure 6G:
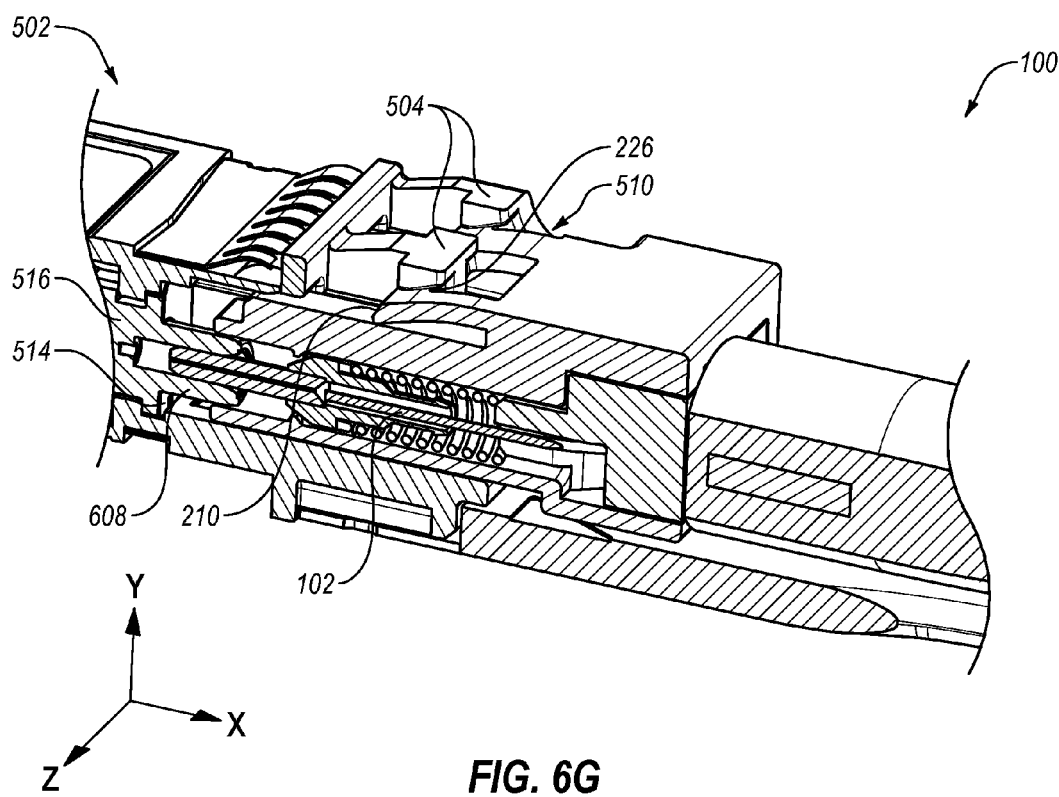

In FIGS. 6C and 6G, the cable connector assembly 100 is depicted partially engaged with the communication module 502. To transition from the position of FIGS. 6B and 6F to the position of FIGS. 6C and 6G, the cable connector assembly 100 may be further moved in the negative x-direction relative to the communication module 502. When the cable connector assembly 100 is partially engaged with the communication module 502, the latch tab 504 is applying a force (e.g., 260 of FIG. 2A) on the ramped surface 210 of the retaining tab 206. The force on the ramped surface 210 may result in the latch structure 208 being displaced in a negative y-direction relative to the latch tab 504. Additionally, the ferrule 402 is positioned further in the OSA 608. In particular, the ferrule 402 is further positioned within the port assembly of the OSA 608.

Figure 6D:
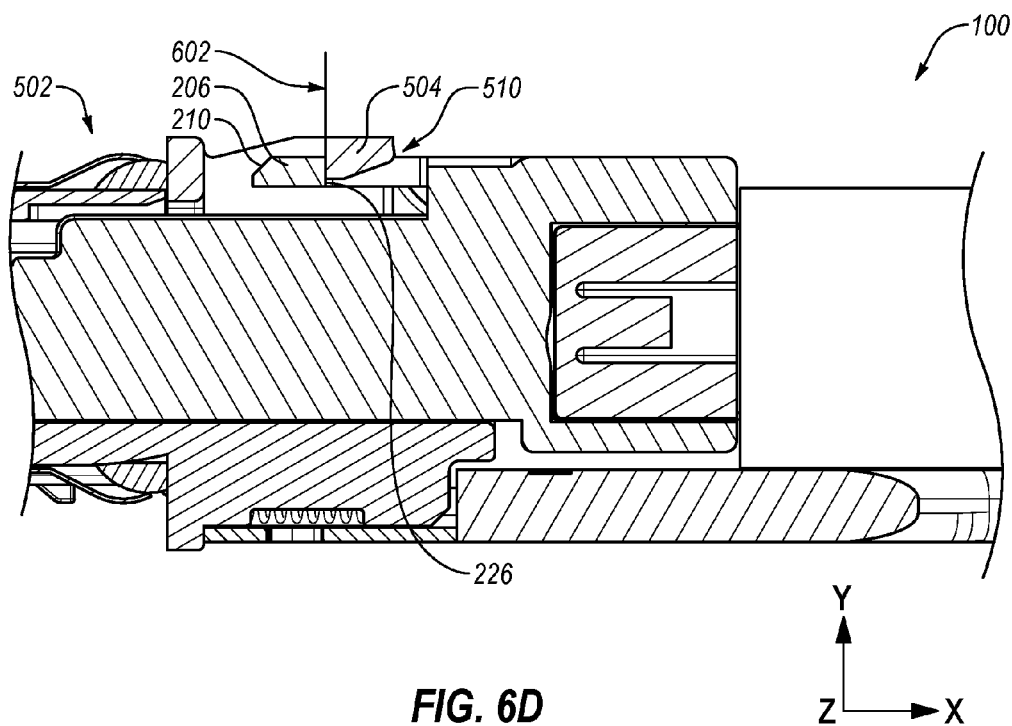
Figure 6H:
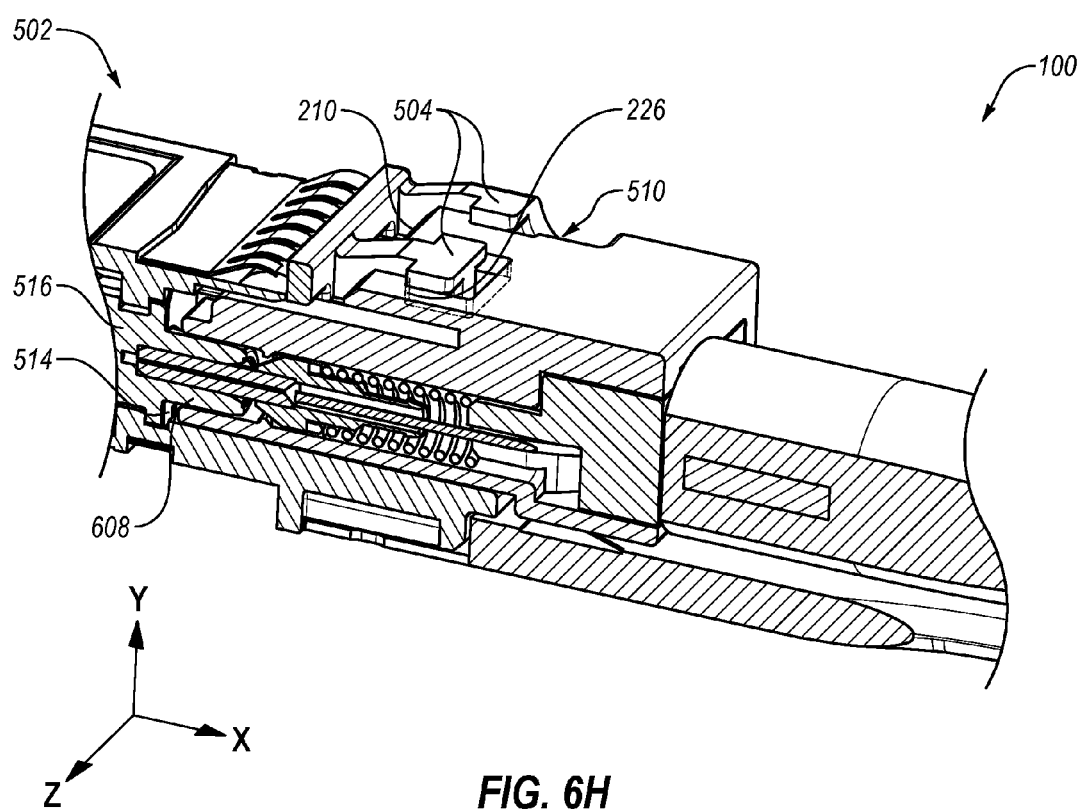

In FIGS. 6D and 6H, the cable connector assembly 100 is depicted engaged with the communication module 502. To transition from the position of FIGS. 6C and 6G to the position of FIGS. 6D and 6H, the cable connector assembly 100 may be further moved in the negative x-direction relative to the communication module 502. When the cable connector assembly 100 is engaged with the communication module 502, the latch tab 504 is no longer applying a force (e.g., 260 of FIG. 2A) to the ramped surface 210 of the retaining tab 206. The retaining tab 206 is moved in the negative x-direction such that the contact surface 226, which may be the trailing surface of the retaining tab 206, is past a datum 602 (FIG. 6D only) defined on by trailing surfaces of the latch tab 504, which is furthest from the cable connector assembly 100. The contact surface 226 may thus press against the latch tab 504 when the cable connector assembly 100 is forced in the positive x-direction relative to the communication module 502. In addition, the ferrule 402 is positioned in the OSA 608. In particular, the ferrule 402 is secured and fully inserted within the port assembly of the OSA 608 such that optical communication between the OSA 608 and the optical fiber 102 may occur via the ferrule 402.

Because the contact surface 226 presses against the latch tab 504 when the cable connector assembly 100 is forced in the positive x-direction relative to the communication module 502, the cable connector assembly 100 may be maintained engaged with the communication module 502. Additionally, neither the cable connector assembly 100 nor the communication module 502 includes a release mechanism that can be operated to disengage the retaining tab 206 from the latch tab 504. Thus, once the cable connector assembly 100 is engaged with the communication module 502, a user may have difficulty disengaging the cable connector assembly 100 from the communication module 502 without a special tool or without damaging one or both of the latch tab 504 or retaining tab 206.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A cable connector assembly comprising:
   a cable connector that is configured to retain portions of optical fibers and to be engaged with a communication module that is configured to receive LC connectors, wherein the cable connector includes:
   a connector housing that defines a housing cavity,
   two fiber support structures that are dimensioned to substantially comply with an LC connector standard, connect to the connector housing, and extend in a first direction from the connector housing, and
   a latch structure that connects to the connector housing, wherein the latch structure extends in the first direction from the connector housing, the latch structure is separated from the two fiber support structures in a second direction, and the latch structure does not include a release structure configured to disengage the latch structure from latch tabs of the communication module such that the latch structure is configurable in a permanently-assembled arrangement with the latch tabs;
   two fiber subassemblies that are at least partially positioned in fiber cavities defined by the fiber support structures; and
   a cable block positioned at least partially within the housing cavity, wherein the cable block is configured to receive two optical fibers and route one of the optical fibers into each of the fiber support structures.

2. The cable connector assembly of claim 1, wherein:
   the latch structure includes two retaining tabs;
   each of the two retaining tabs is connected to the connector housing by a longitudinal section;
   each of the retaining tabs include contact surfaces that are substantially parallel to the second direction; and
   each of the retaining tabs includes a ramped surface that is angled relative to the second direction.

3. The cable connector assembly of claim 2, wherein the ramped surface is configured to displace the retaining tab in a direction opposite the second direction in response to a force applied to the ramped surface in a direction opposite the first direction.

4. The cable connector assembly of claim 2, wherein a distance between the longitudinal sections substantially corresponds to a width of an LC connector retaining structure of the communication module.

5. The cable connector assembly of claim 1, wherein each of the two fiber subassemblies include:
a ferrule that is configured to be coupled to an end of one of the optical fibers; and
a coiled spring that surrounds a portion of the ferrule.

6. The cable connector assembly of claim 5, wherein:
the ferrule is configured to be positioned in an optical subassembly (OSA) of the communication module; and
the fiber cavities are defined to receive a portion of a barrel of the OSA.

7. An active optical cable comprising:
an optical cable that includes the optical fibers;
a communication module that is configured to receive LC connectors; and
the cable connector assembly of claim 1.

8. A cable connector comprising:
a connector housing that defines a housing cavity;
two fiber support structures attached to the connector housing and extend from the connector housing in a first direction, wherein the fiber support structures each define a fiber cavity that is configured to receive a fiber subassembly;
a latch structure that is attached to the connector housing at a first end and that extends from the connector housing in the first direction, wherein:
the latch structure is separated in a second direction from the fiber support structure and includes a ramped surface at a second end, and
the ramped surface is configured to displace the latch structure in a direction opposite the second direction in response to a force applied to the ramped surface in a direction opposite the first direction; and
the cable connector does not include a release structure configured to disengage the latch structure from latch tabs of a communication module such that the latch structure is configurable in a permanently-assembled arrangement with the latch tabs.

9. The cable connector of claim 8, wherein:
the latch structure includes two retaining tabs;
each of the two retaining tabs is connected to the connector housing by a longitudinal section;
each of the retaining tabs includes contact surfaces that are substantially parallel to the second direction; and
each of the retaining tabs includes a ramped surface that is angled relative to the second direction.

10. The cable connector of claim 9, wherein:
a distance between the longitudinal sections substantially corresponds to a width of an LC connector retaining structure of the communication module; and
the fiber support structure is dimensioned to substantially comply with an LC connector standard.

11. The cable connector of claim 8, wherein each of the fiber cavities includes a hexagonal portion configured to receive a portion of a ferrule.

12. The cable connector of claim 8, wherein the connector housing defines a stub opening that is configured to receive a positioning stub of a cable block positioned in the connector housing.

13. An active optical cable comprising:
an optical cable that includes one or more optical fibers;
a cable connector assembly positioned at an end of the optical cable, wherein the cable connector assembly includes a cable connector that further includes a connector housing that defines a housing cavity, two fiber support structures, and a latch structure that is configured to retain portions of the optical fibers and one or more optical fiber subassemblies; and
a communication module that is configured to electrically interface with a host system at a first end and includes optical subassemblies and one or more latch tabs at a second end,
wherein:
the latch structure does not include a release structure configured to disengage the latch structure from latch tabs of the communication module;
the communication module is configured to optically interface with an LC type optical fiber connector, and
the active optical cable is configurable in a permanently-assembled arrangement in which the latch structure is engaged with the latch tabs to join to the communication module relative to the cable connector assembly such that the cable connector assembly is substantially fixed relative to the communication module and the optical fibers are coupled to the optical subassemblies.

14. The active optical cable of claim 13, wherein:
the cable connector includes a connector housing and fiber support structures that extend in a first direction from the connector housing;
the latch structure is attached to the connector housing at a first end and that extends from the connector housing in the first direction;
the latch structure is separated in a second direction from the fiber support structures and includes a ramped surface at a second end; and
the ramped surface is configured to displace the latch structure in a direction opposite the second direction in response to the cable connector assembly being moved in towards the communication module such that the latch tabs contact the ramped surface.

15. The active optical cable of claim 14, wherein:
the latch tabs include a retaining surface;
the latch structure includes retaining tabs at the second end;
the retaining tabs include contact surfaces that are substantially parallel to the second direction; and
in an assembled arrangement, the contact surfaces are in contact with the retaining surface.

16. The active optical cable of claim 14, wherein:
the fiber support structures substantially comply with LC standards, and
in the permanently-assembled arrangement, the latch structure cannot be disengaged from the latch tabs without a tool.

17. The active optical cable of claim 13, wherein the cable connector that is configured to retain a cable subassembly includes a Y channel that separates terminal portions of two of the optical fibers.

18. The active optical cable of claim 13, wherein the optical fiber subassemblies include:
a portion of an optical fiber;
a ferrule that is coupled to an end of the optical fiber; and
a coiled spring that surrounds a portion of the ferrule.

19. The active optical cable of claim 18, wherein:
the cable connector includes a connector housing and a fiber support structure that extends in a first direction from the connector housing; and
the optical fiber subassembly is positioned in the fiber support structure.

20. The active optical cable of claim 19, wherein a cavity defined by the fiber support structure includes a hexagonal portion configured to receive a portion of the ferrule.

* * * * *